April 9, 1963  H. HERTEL  3,084,888
VTOL AIRCRAFT
Filed Oct. 13, 1961  6 Sheets-Sheet 1
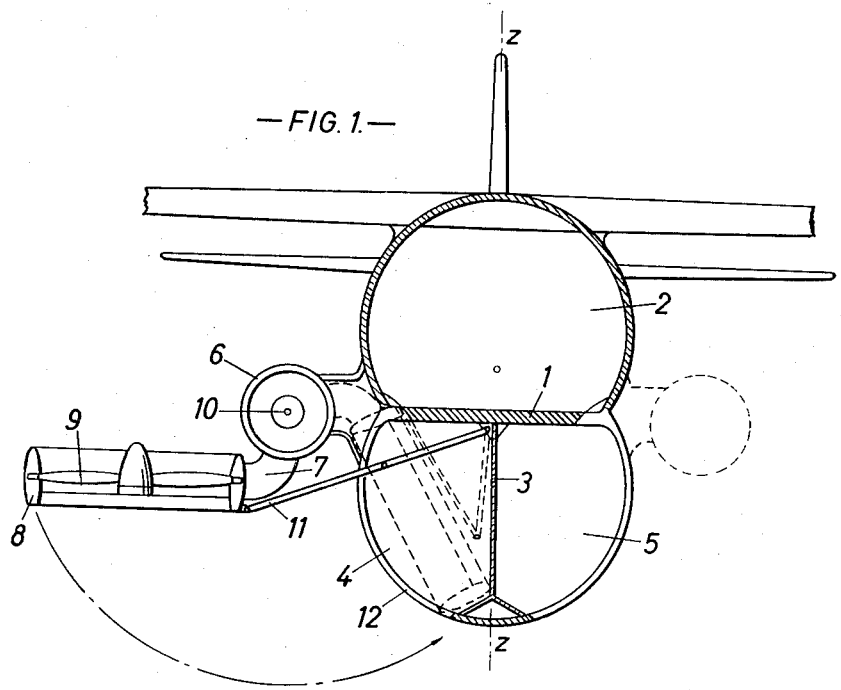
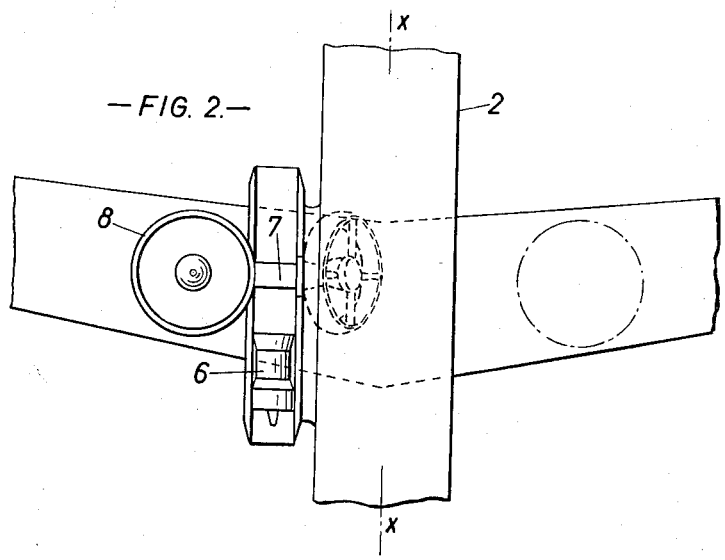
INVENTOR
HEINRICH HERTEL.
BY
ATTORNEY.

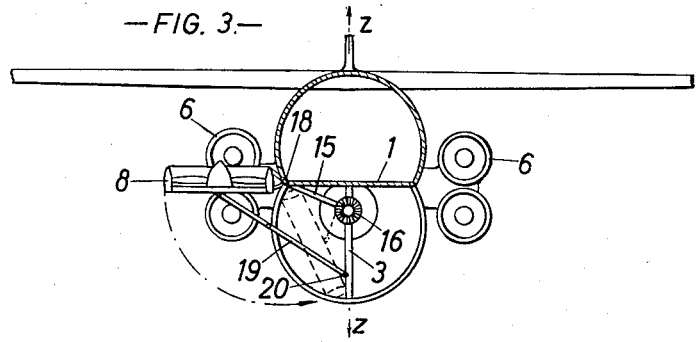
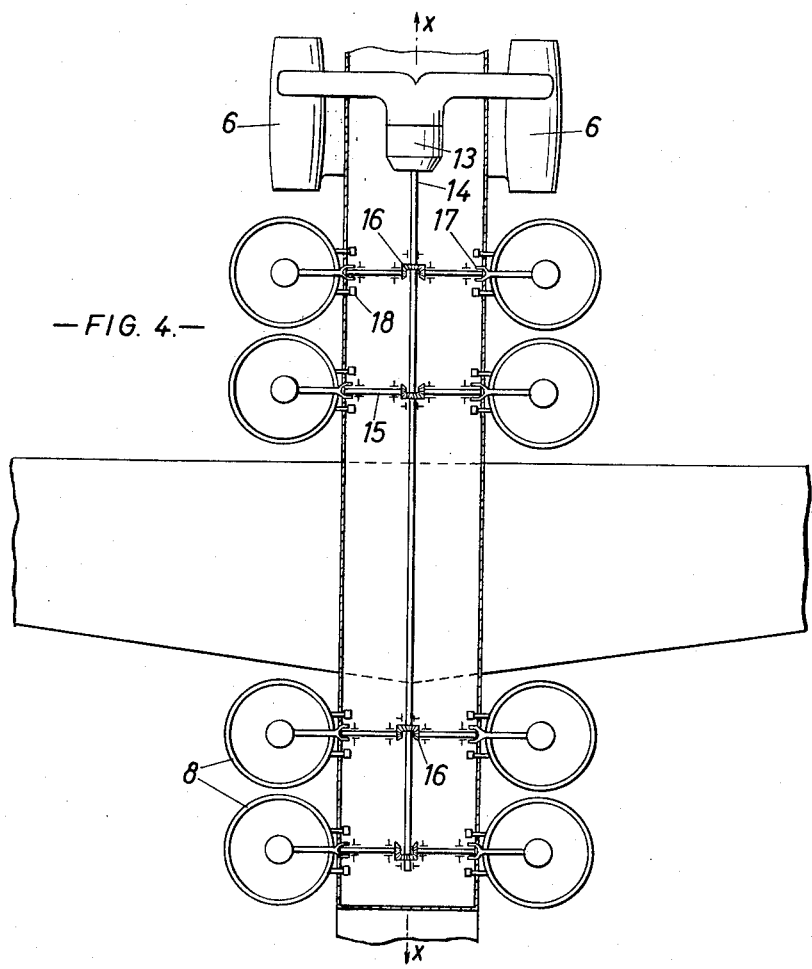

April 9, 1963 H. HERTEL 3,084,888
VTOL AIRCRAFT
Filed Oct. 13, 1961 6 Sheets-Sheet 3
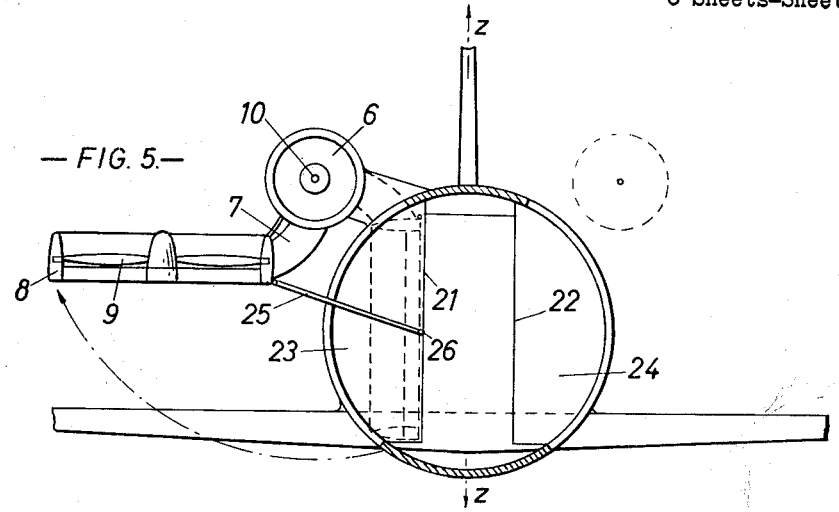
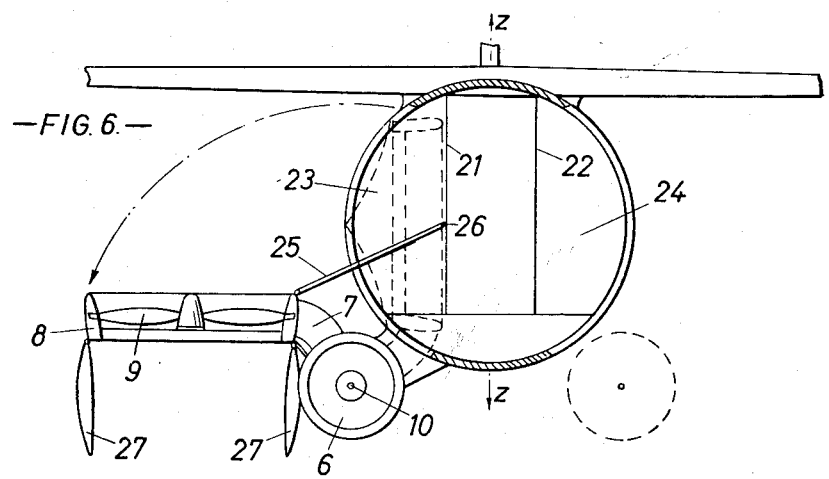
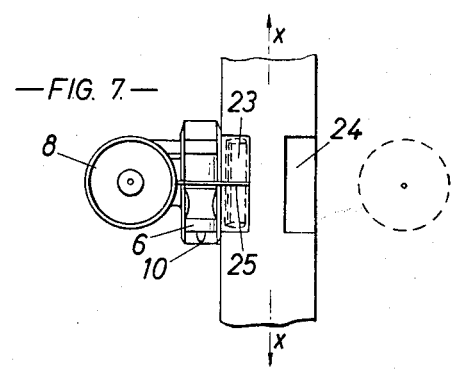
INVENTOR
HEINRICH HERTEL
BY
ATTORNEY

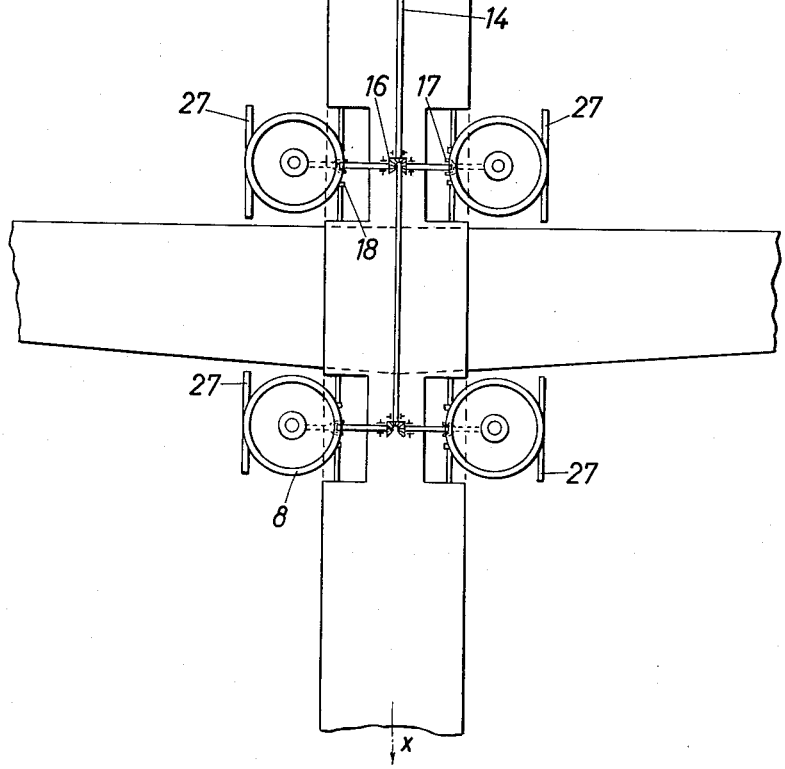

April 9, 1963  H. HERTEL  3,084,888
VTOL AIRCRAFT
Filed Oct. 13, 1961  6 Sheets-Sheet 5
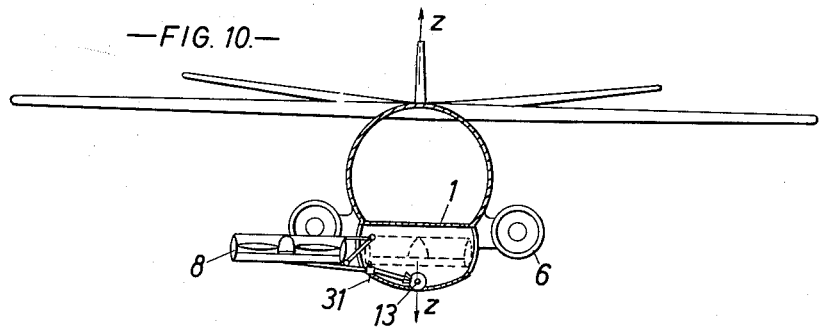
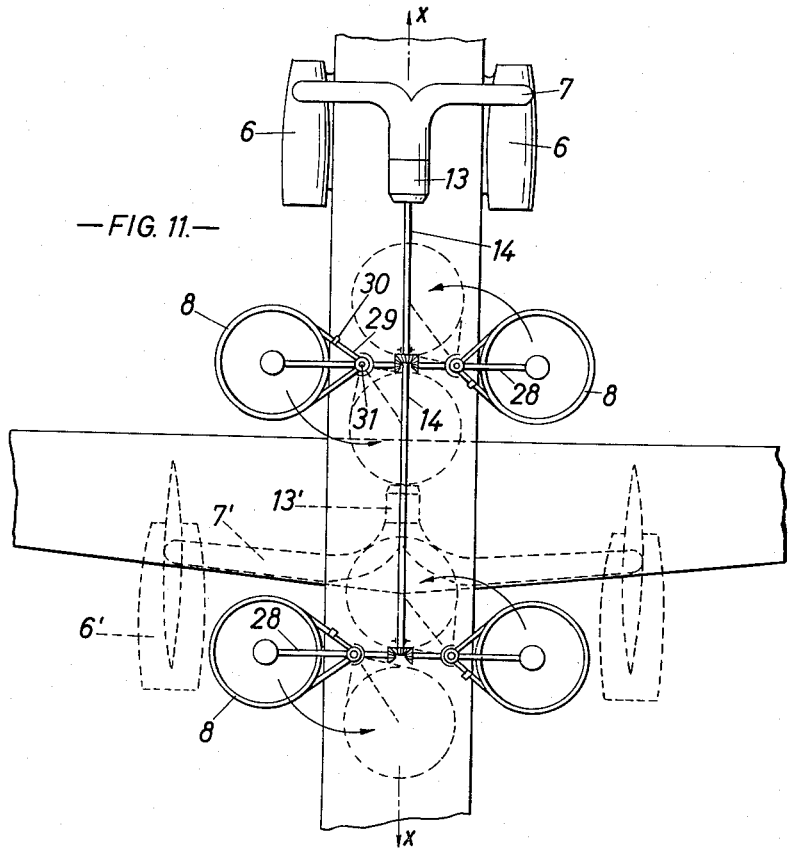
INVENTOR
HEINRICH HERTEL
BY
ATTORNEY

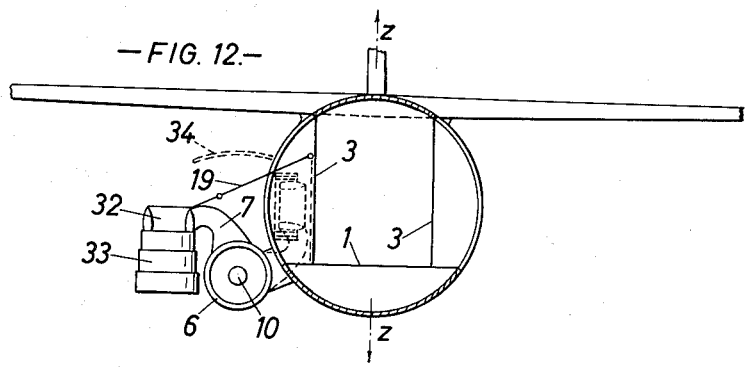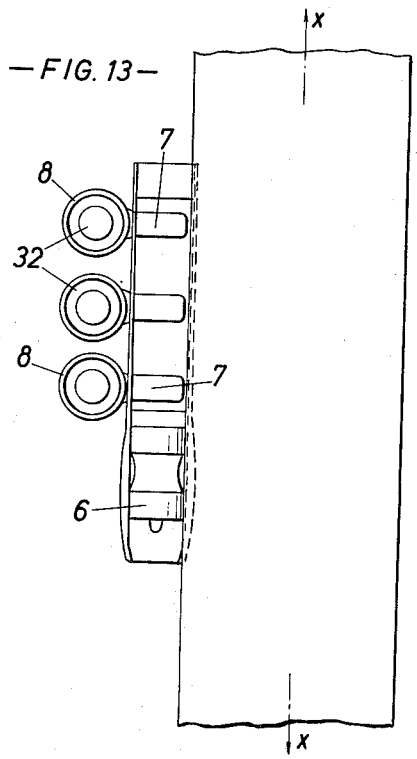

United States Patent Office 3,084,888
Patented Apr. 9, 1963

3,084,888
VTOL AIRCRAFT
Heinrich Hertel, Berlin-Charlottenburg, Germany, assignor to Focke-Wulf Gesellschaft mit beschraenkter Haftung
Filed Oct. 13, 1961, Ser. No. 144,994
15 Claims. (Cl. 244—23)

The present invention concerns aircraft which by means of lifting jets are able to effect a substantially vertical take-off and landing.

Aircraft are known which have both horizontal propulsion and vertical take-off drives. In these known aircraft the vertical take-off propulsion means and also the horizontal propulsion means are rigidly connected to the nacelle. The horizontal propulsion generally consists of separate jet propulsion units with their own gas generator, or it may in many cases comprise turbo gas generators or turbo-prop units. Such propulsion devices are known to be so controlled that on take-off, soaring or coming in to land they transmit their full output to the adjacent or associated lifting jets, whilst during horizontal flight they serve only for propulsion. Between vertical flight and horizontal flight known aircraft are provided with transition means, the output of the horizontal propulsion unit being transmitted only partially to the lifting jets.

Known lifting jets accommodated in the interior of the nacelle preferably in the wing produce no air resistance during horizontal flight. In order however to obtain a good throughflow of the jet duct of the lifting jets which are substantially vertically aligned during operation in the transition flight it has been proposed to arrange at the air intake side, i.e. at the upper end of the jet duct of the vertical lift units, air baffle plates adapted to be optionally run out upwardly from the strake of the nacelle, which plates take the incident head on flight wind and deflect it downwards into the jet duct. Such known air baffle plates either comprise flaps adapted to be raised against the airflow or curved air baffle plates arranged in separate frame members adapted to be extended in an upward direction from the strake of the nacelle, the retaining or adjusting members of which are of considerable thickness in consideration of the considerable aerodynamic forces occurring. These special holding members and also the frame elements even in the retracted state, i.e. during horizontal flight, are very bulky in the interior of the nacelle and cause a considerable increase of weight. The thickness of a wing in modern aircraft is inadequate to accommodate both a lifting jet and a frame with baffles adapted to be extended and retracted. In any case the internal supporting framework of the wing has to be very complicated due to the necessary force deflection and causes considerable detrimental weight increase.

When arranging lifting jets with baffles adapted to be extended and retracted in the interior of the fuselage practically the whole fuselage cross-section in aircraft of known type is occupied. The free passage in the interior of the fuselage from one end to the other end thereof is blocked or unduly restricted.

Arranging several lifting jets one behind the other would occupy practically the whole cargo space of the fuselage or the cabin space for passengers.

Known aircraft having lifting jets arranged in the interior of the fuselage already include arrangements by which the lifting jets individually or severally are adapted to be adjusted about a pivotal axis extending at right angles to the longitudinal axis of the jet, for example, about pivotal axes extending parallel to the transverse axis of the aircraft. This adjustability of the lifting jets however so reduces space in the interior of the aircraft that such solutions have hitherto seldom been proposed.

The purpose of the present invention is generally to avoid the above noted disadvantages.

The basic concept of the present invention consists having the lifting jets so mounted as to be pivotal into or out of position in or on the fuselage so that in the inoperative position they are in the interior of the nacelle, preferably in the interior of the fuselage, and when in operation are situated outside the nacelle, the necessary openings in the skin of the aircraft being closed by means of hinge-like cover elements extending flush therewith. The drive for the lifting jets is diverted from the horizontal propulsion units, which, therefore, constitute the prime mover.

Several lifting jets arranged in series one behind the other in accordance with the invention in such a way from the nacelle that they are of different heights and are staggered according to their heights, the inlet openings of all lifting jets being impacted to an equal extent by the airflow thereover.

In further development of the invention provision is made for the individual components of a lifting jet, for example, the screw jacket and the jet impeller together with their mountings to be adapted to be successively extended and retracted, so that, during the transition to high speed horizontal flight, the most favourable momentary blower stream of the structural members of the lifting jet is adjustable.

The invention will be described further, by way of example, with reference to the accompanying drawings, in which:

FIG. 1 is a cross-section through a fuselage diivded by means of a horizontal partition having lifting jets adapted to be extended and retracted laterally in the lower fuselage portion;

FIG. 2 is a plan view of FIG. 1;

FIG. 3 is a fuselage cross-section similar to FIG. 1 but with a common drive for several lifting jets arranged in pairs;

FIG. 4 is a plan view of the arrangement of FIG. 3 showing the position and arrangement of several horizontal propulsion units, a turbine and a driving shaft common to all lifting jets with lateral shafts associated therewith;

FIG. 5 is a cross-section through a fuselage of a low wing aircraft showing, a lifting jet adapted to be retracted into and run out of the fuselage being mounted on the aircraft so as to be pivotal about an axis extending parallel to the longitudinal axis of a horizontal propulsion unit;

FIG. 6 is a cross-section through a fuselage similar to FIG. 5, but mounted on a so-called high wing aircraft having a fuselage of circular cross-section;

FIG. 7 is a plan view of the embodiments of FIGS. 5 and 6;

FIG. 8 is a cross-section through a fuselage of an aircraft in which the lifting jets are adapted to be extended laterally from the fuselage and in their inoperative position are retained hinged back into lateral recesses of the fuselage;

FIG. 9 is a plan view of the arrangement of FIG. 8; craft having lifting jets adapted to be folded back into FIG. 10 is a cross-section through a fuselage of an aircraft having lifting jets adapted to be folded back into the fuselage with a pivotal axis extending parallel to the vertical axis of the aircraft;

FIG. 11 is a plan view of the arrangement of FIG. 10;

FIG. 12 is a cross-section through a fuselage of an aircraft having injector lifting jets adapted to be extended and retracted, which jets are adapted to be swivelled about a pivotal axis extending parallel to the longitudinal centre line of the fuselage, the injector nozzle of each lifting jet having a longitudinally adjustable jet mixing tube connected thereto; and FIG. 13 is a plan view of the arrangement to FIG. 12.

In the embodiment shown in FIGS. 1 and 2 the fuselage is divided in the longitudinal direction by means of a horizontally extending partition 1 during normal flight, so that the upper space is available for accommodating luggage and equipment. The lower space in the region of the lifting jet units is divided by a vertical wall 3, forming lateral compartments 4 and 5, for accommodating the pivotal lifting jets. At both sides of the fuselage approximately level with the partition 1 horizontal propulsion units 6 are arranged in pairs spaced from the fuselage, the gas generators for these units communicating with the hollow ring cowl 8 via controllable gas conduits 7. In this cowl there is provided a bladed ring which rotates the propeller 9 of the lifting jet. The lifting jet substantially comprising the ring cowl 8 with the propeller 9 is arranged so as to be horizontally pivoted about the longitudinal centre line 10 of the horizontal propulsion unit 6, the gas supply conduit 7 acting as pivotal arm. The longitudinal centre line 10 acts as pivotal axis for the lifting jet. It extends parallel to the longitudinal axis x—x of the fuselage. In the extended position the lifting jet is supported against the upper portion of the fuselage partition 3 by means of an articulated strut 11, the angle of articulation of which, for example, is controlled by an electric motor mounted on the strut. In the inoperative position the lifting jet is situated in one of the lateral compartments 4 or 5, as shown in broken lines in FIG. 1. The openings 12 in the lower fuselage skin are closed on the outside in a manner known per se by means of sliding elements having contours corresponding to the curvature of the fuselage.

In vertical flight the full output of the horizontal propulsion unit, thus the actual prime mover, is transmitted to the lifting jet, whilst the latter during normal flying is completely cut off.

Whilst in the example according to FIGS. 1 and 2 the output power transmission from the horizontal propulsion unit to the associated lifting propulsion unit is effected by transfer of hot gases, the power transmission in the examples according to FIGS. 3 and 4 is effected by mechanical means by a turbine 13 common to both sides of the fuselage by means of a transmission shaft 14 with lateral shafts 15. The propulsion units 6 arranged in pairs during vertical flight transmit their power to the turbine 13, which actuates the lifting jets arranged in rows one behind the other on either side of the length of fuselage, via the shafts 14 and 15. The shafts 14 and 15 are interconnected by bevel wheels 16. The lateral shafts 15 have universal joints 17. The pivotal axis in this example is situated on the outer edge of the fuselage partition 1. The extended articulated strut 19 retains the lifting jet in the operative position. This strut is hingedly connected to the vertical partition 3 at the point 20. The partitions 1 and 3 in the interior of the fuselage form a longitudinally extending stringer and constitute components of the static bracing of the fuselage supporting framework.

In the embodiment shown in FIGS. 5, 6 and 7 a fuselage has a circular cross-section. Each horizontal propulsion unit 6 communicates with the associated lifting jet via a gas supply conduit 7 which also acts as the supporting arm of the pivotal lifting jet. In the interior of the fuselage in the region of the lifting jets two vertical partitions 21, 22 with clearance from the longitudinal centre line of the fuselage are arranged forming lateral receiving compartments 23, 24. The ring cowl 8 of the lifting jet is connected with an integral supporting strut 25 which with its end facing the fuselage at a point 26 is connected to the vertical partition 21. When the lifting jet is retracted, the bearing of the journal point 26 in the embodiment shown in FIG. 5 is shifted downwards into a guide bar, not shown, on the partition 21 or 22. In the embodiment shown in FIG. 6 the journal point 26 shifts upwardly. The lifting jet is thus hinged or folded up against the vertical partition 21 or 22 when not in use and the fuselage opening is closed by means of a number of flap elements, which, for example, as shown in FIG. 6 are journalled on the ring cowl 8. In the open position they serve as cowl extensions. The position shown in broken lines is the closed position. The partitions 21, 22 together with an upper transverse wall and a lower transverse wall form, at least in the region of the lifting jets, a box girder extending in longitudinal direction of the fuselage shell. This box girder is so wide and deep that persons and loads can pass or be passed through in the longitudinal direction of the fuselage. This box girder is fixed on the inner wall of the supporting fuselage shell. In the embodiment shown in FIGS. 8 and 9 the lifting jet is adapted to be hinged back upwardly, the jet jacket being adapted to be folded back independently of the impeller. This, for example, is possible when the ring cowl 8 is provided with two articulated struts and the impeller bearing is centrally provided with an additional articulated strut. The air screw bearing is journalled coaxially with the hingedly mounted ring cowl on the fuselage by means of a supporting arm.

In the embodiment shown in FIGS. 10 and 11 the lifting jets are hinged to move inwards about pivots 31, which extend parallel to the vertical aircraft axis z—z, into the lower fuselage portion. When the lifting jets are arranged in pairs, one is hinged forwardly and the other towards the rear, so that both associated lifting jets, when not in use, assume a position one behind the other on the same level in the interior of the fuselage beneath the floor to bear the weight of a person. The impeller cowl in the example shown is supported against the aircraft fuselage by means of two splayed struts 29 which together with cowl body form a triangular bracing. Stop members 30 are provided which automatically locate the struts 29 in the swung out position relative to the fuselage. The two splayed struts 29 are pivotally mounted at their apex through which extends the geometrical pivotal axis 31 and which extends parallel to the vertical axis of the aircraft, so that the lifting jets, in the inoperative position, assume a flush position beneath the floor 1.

In accordance with the embodiment of FIGS. 12 and 13 injector lifting jets are provided which are adapted to be swung into the lateral fuselage compartments about an axis coinciding with the geometrical longitudinal axis 10 of the horizontal propulsion unit. The propulsion gases of the propulsion unit 6 are supplied by means of the conduits 7 constructed as pivotal supporting arms for the lifting jets. An injector nozzle 32 is connected to each of the conduits 7, being supported against the fuselage by means of articulated struts 19. To each injector nozzle 32 there is connected a longitudinally extensible and retractable mixing tube 33 comprising a plurality of tubular bodies adapted to be slid telescopically into one another, which tube is retracted when the injector is retracted. During operation of the lifting jet the flap body 34 simultaneously acts as air baffle. The vertical partitions 3 together with the horizontal partition 1 forming the floor adapted to be walked on form a wide-flanged or box girder continuous in the region of the lifting jets and are connected to the supporting fuselage shell.

The synchronised articulated shafts 28 form the extension of the lateral shafts 15.

I claim:

1. In an aeroplane, a fuselage, a plurality of lifting jet means, means for mounting said jet means relative to said fuselage in a condition for lifting operation, means for mounting said jet means within said fuselage in a stowage condition and means for moving said jet means from one of said conditions to the other of said conditions.

2. In a structure according to claim 1 including at least one jet means supporting arm and at least one jet means supporting strut.

3. A structure according to claim 2, said strut being of variable length.

4. A structure according to claim 2, said strut being articulated.

5. A structure according to claim 1, the fuselage being apertured to permit passage of each jet means into and out of the fuselage, and including means for closing said fuselage apertures.

6. A structure according to claim 1, including wall means within the fuselage and means for supporting said jet means connected to said wall means.

7. A structure according to claim 1, including wall means within said fuselage, said wall means constituting an airframe stressed member such as a girder.

8. A structure according to claim 1, said fuselage having a fore-and-aft centre line, said structure including a plurality of lifting jet means arrangeable in line substantially parallel to said centre line.

9. In an aeroplane, a fuselage having a plurality of apertures therein, a plurality of lifting jet means, means for mounting said means alternatively outside the fuselage in a lifting condition and within the fuselage in a stowage condition, means for causing each said jet means to pass through a fuselage aperture in transition from one of its said conditions to the other of its said conditions, and means for closing each said fuselage aperture.

10. A structure according to claim 9, including means for operating said closing means and means mechanically coupled to said closing means operating means for displacing said jet means from one said condition to the other said condition thereof.

11. A structure according to claim 7, said fuselage aperture closing means being hingedly mounted relative to the fuselage and of double-walled construction, being shaped appropriately to act in an open position as an air baffle means.

12. A structure according to claim 9, including a ring cowl for each said jet means, said cowl comprising a plurality of telescopically displaceable parts.

13. A structure according to claim 1, including a plurality of lifting jet means disposable in line but vertically staggered relative to one another.

14. A structure according to claim 1, including a power transmission means having an axis of rotation, said lifting jet means being pivotal about an axis coincident with said axis of rotation.

15. A structure according to claim 1, including a hollow supporting arm means for said lifting jet means, said arm means also serving as a power conduit for propulsion gases.

References Cited in the file of this patent

UNITED STATES PATENTS

| 2,052,086 | Dornier | Aug. 25, 1936 |
| 2,885,159 | Ashwood | May 5, 1959 |
| 2,977,071 | Plotkowiak | Mar. 28, 1961 |
| 2,989,269 | Le Bel | Jan. 20, 1961 |

FOREIGN PATENTS

| 189,294 | Switzerland | May 18, 1937 |
| 1,029,559 | France | Nov. 10, 1954 |